Feb. 2, 1926.

Re. 16,258

J. DISCH ET AL

ADJUSTABLE STEP FOR AUTOMOBILE RUNNING BOARDS

Original Filed May 27, 1922

INVENTORS.
Joseph Disch
John G. Frese

BY
Dewey, Strong, Townsend & Lyftus
ATTORNEYS.

Reissued Feb. 2, 1926. Re. 16,258

UNITED STATES PATENT OFFICE.

JOSEPH DISCH AND JOHN G. FRESE, OF ST. LOUIS, MISSOURI, ASSIGNORS TO L. J. COMSTOCK, OF OAKLAND, CALIFORNIA.

ADJUSTABLE STEP FOR AUTOMOBILE RUNNING BOARDS.

Original No. 1,457,152, dated May 29, 1923, Serial No. 564,024, filed May 27, 1922. Application for reissue filed May 25, 1925. Serial No. 32,853.

*To all whom it may concern:*

Be it known that we, JOSEPH DISCH and JOHN G. FRESE, citizens of the United States, and residents of St. Louis, Missouri, have invented certain new and useful Improvements in an Adjustable Step for Automobile Running Boards, of which the following is a specification.

This invention relates to improvements in an adjustable step for automobile running boards, and has for its object a step composed preferably of two-parts arranged to be fitted together so as to accommodate a narrow as well as a deep step; thus allowing the rear portion to fit snug up against the machine frame and the front edge to snugly contact with the front edge of the running board.

By means of the sliding feature the step can be adjusted to fit the running board in the event the same should become out of alignment and at the same time avoiding a space between the rear and the frame work or body of the machine.

The step is made out of durable light material the surface of the plate or foot section provided with a ridge or uneven or irregular surface so as to prevent slippage. The extreme front is provided with a scraper by which mud can be removed from the shoe, and the step in general ornamented to suit convenience in order to make a neat and unique appearance when placed in position on the running board.

Figure 1:
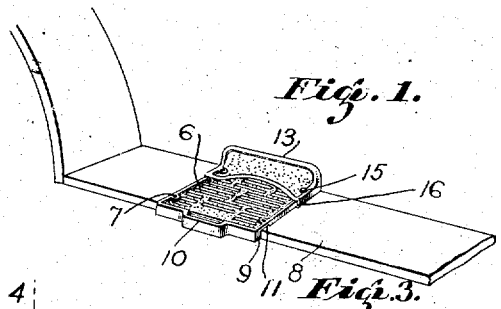
Fig. 1 is a perspective view of our invention shown in position on the running board.
Figure 2:
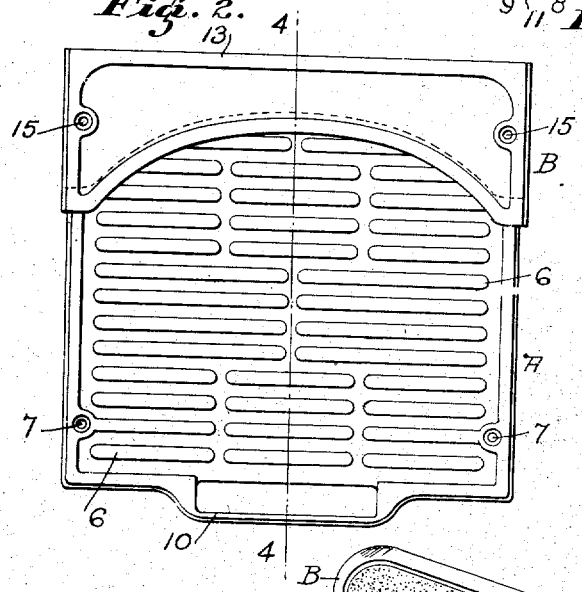
Fig. 2 is a top plan view.
Figure 3:
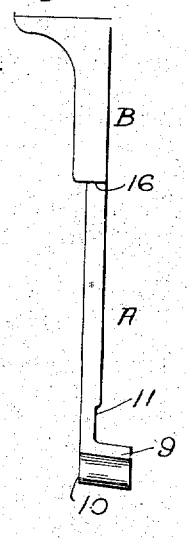
Fig. 3 is a side view.
Figure 4:
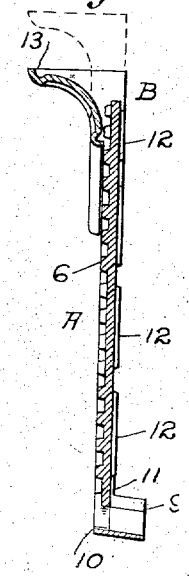
Fig. 4 is a sectional view taken on the line 4—4 of Fig. 2.
Figure 5:
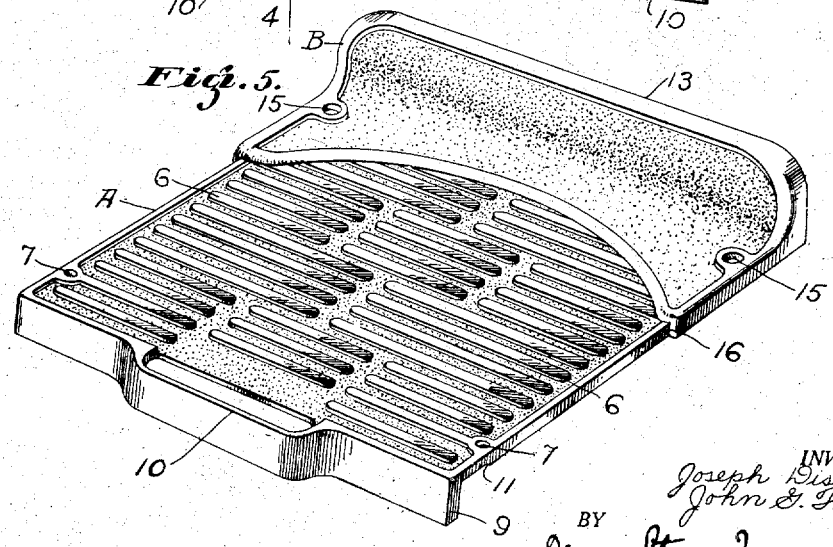
Fig. 5 is a detail perspective view of our improved adjustable step detached from the running board.

In the general construction of our invention we provide a step preferably composed of two sections A and B. The section A is preferably termed a foot-plate, the surface of which is provided with elevations or corrugations 6 to provide a roughened surface for the foot so as to prevent slippage.

This plate is provided with apertures 7 through which screws or the like are inserted for fastening the plate to the running board 8.

The front surface of the plate is provided with a downwardly extending flange 9 which is suitably bent to form a scraper 10. This is preferably designed for removing mud from the shoe before entering the automobile.

The frame which comprises the plate is provided with a cut-away portion 11 which fits over the finishing strip generally attached to the front edge of the running board, and the bottom of the plate is provided with suitable projections 12 which rest upon the running board and hold the plate in firm position.

The section B is the sliding or adjustable section, the rear edge 13 is to be brought in communication or contact with the frame or body of the machine, and it is provided with apertures 15 through which fastening devices are inserted for attaching the same to the running board. This section is provided with a flange 16 which fits over the side edge of the plate A so as to make a close joint of neat appearance.

This adjusting plate B may be ornamented to suit the convenience and at the same time this section acts as a toe plate to prevent the toe of the shoe from marring or scratching the polished surface of the machine frame or body.

The essential feature of this structure of plate is to make the same of two sections to be adjusted to accommodate any width of running board.

Having fully described our invention what we claim is:

1. A step of the character described comprising an ornamental foot plate having a front contacting flange, a scraper formed by said flange, said plate attached to the running board and a toe section slidably mounted on said plate and brought in contact with the body of the machine, thereby taking the full depth of the running board, substantially as specified.

2. A step of the character described comprising a foot plate having a front contacting flange, said plate adapted to be attached to the running board of an automobile, and a toe plate slidably mounted on said plate and adapted to be brought into contact with the body of the automobile thereby taking the full depth of the running board, substantially as described.

3. A step of the character described comprising a foot plate having a front contacting flange, said plate adapted to be attached to the running board of an automobile, an adjustable plate slidably mounted on the foot plate and adapted to be brought in contact with the body of the automobile, thereby taking the full depth of the running board, and means for securing said adjustable plate.

4. An adjustable step for automobile running boards comprising a foot plate adapted to be secured to the running board, a front flange on said plate extending from end to end thereof and overlapping the outer edge of the running board, a toe plate slidably mounted on the foot plate and adapted to be brought in contact with the body of the automobile, and means for securing the toe plate.

5. An ornamental foot plate for running boards of vehicles comprising a tread portion, a toe plate at the inner edge thereof having an upwardly extending flange adapted to contact with the body of the vehicle, a scraper member at the outer edge of the tread portion and means for securing the scraper member and the toe plate with relation to the running board, said toe plate and scraper member being adjustable toward and from each other to accommodate running boards of varying widths.

6. A foot plate for running boards of vehicles comprising a tread portion, an adjustable plate at the inner edge thereof and adapted to contact with the body of the vehicle, a scraper member at the outer edge of the tread portion having a downwardly extending flange to engage the edge of the running board and means for securing the first named plate and the scraper plate with relation to the running board.

JOSEPH DISCH.
JOHN G. FRESE.